United States Patent
Ghauri

(10) Patent No.: US 9,001,172 B2
(45) Date of Patent: Apr. 7, 2015

(54) SYSTEM FOR LASER-BASED DIGITAL MARKING OF OBJECTS WITH IMAGES OR DIGITAL IMAGE PROJECTION WITH THE LASER BEAM SHAPED AND AMPLIFIED TO HAVE UNIFORM IRRADIANCE DISTRIBUTION OVER THE BEAM CROSS-SECTION

(75) Inventor: Farzan Ghauri, Chicago, IL (US)

(73) Assignee: Vardex Laser Solutions, Inc., Chicago, IL (US)

( * ) Notice: Subject to any disclaimer, the term of this patent is extended or adjusted under 35 U.S.C. 154(b) by 228 days.

(21) Appl. No.: 13/206,189

(22) Filed: Aug. 9, 2011

(65) Prior Publication Data

US 2011/0292157 A1 Dec. 1, 2011

Related U.S. Application Data

(60) Provisional application No. 61/372,197, filed on Aug. 10, 2010.

(51) Int. Cl.
| | |
|---|---|
| B41J 2/435 | (2006.01) |
| B23K 26/00 | (2014.01) |
| B23K 26/06 | (2014.01) |
| B41J 2/44 | (2006.01) |
| B41J 2/465 | (2006.01) |
| B41M 5/26 | (2006.01) |

(52) U.S. Cl.
CPC ......... *B23K 26/0066* (2013.01); *B23K 26/0656* (2013.01); *B41J 2/442* (2013.01); *B41J 2/465* (2013.01); *B23K 26/0009* (2013.01); *B41M 5/26* (2013.01)

(58) Field of Classification Search
USPC ........................................ 347/110, 224, 225
See application file for complete search history.

(56) References Cited

U.S. PATENT DOCUMENTS

| | | |
|---|---|---|
| 5,757,839 A | 5/1998 | Biswal et al. |
| 6,275,250 B1 | 8/2001 | Sanders et al. |

(Continued)

OTHER PUBLICATIONS

Texas Instruments, "Using Lasers with DLP® DMD Technology," Sep. 2008, pp. 1-9, Texas Instruments Inc.

(Continued)

*Primary Examiner* — Hai C Pham
(74) *Attorney, Agent, or Firm* — Terry M. Sanks, Esq.; Beusse Wolter Sanks & Maire, P.A.

(57) ABSTRACT

A laser marking system including a laser apparatus to supply a laser beam having a non-Gaussian irradiance distribution over a beam cross-section, the non-Gaussian irradiance distribution of the laser beam has a substantially uniform irradiance distribution over the beam cross-section, a spatial light modulator coupled to receive the laser beam, the spatial light modulator is controlled to generate an output laser beam including an optical pattern across the beam cross-section to mark a target object with the data code matrix, and an optical amplifier coupled to the spatial modulator to receive the laser beam output from the spatial light modulator and generate an amplified laser beam containing the same optical pattern as generated by the spatial light modulator, the amplified laser beam from the optical amplifier having a substantially uniform amplification across the cross-section of the beam, the amplified beam maintaining the substantially uniform irradiance distribution over its beam cross-section.

38 Claims, 10 Drawing Sheets

(56) References Cited

U.S. PATENT DOCUMENTS

| | | |
|---|---|---|
| 6,836,284 B2 | 12/2004 | Murokh et al. |
| 6,943,950 B2 | 9/2005 | Lee et al. |
| 7,058,109 B2 | 6/2006 | Davis |
| 7,085,304 B2 | 8/2006 | Vetrovec |
| 7,112,760 B2 * | 9/2006 | Ishikawa et al. ......... 219/121.76 |
| 7,439,993 B2 * | 10/2008 | Ishimi et al. .................. 347/179 |
| 2005/0018738 A1 | 1/2005 | Duan et al. |
| 2008/0105664 A1 * | 5/2008 | Smart ...................... 219/121.72 |

OTHER PUBLICATIONS

Silfvast, William T., "Frequency Multiplication of Lasers and Other Nonlinear Optical Effects," Laser Fundamentals 2nd Ed., 1996, pp. 601-808, Cambridge University Press, UK.
Goodman, Joseph W., "Wave-Optics Analy. of Coherent Opt. Sys.," "Frequency Analy. of Opt. Imag. Sys.," Int. to Fourier Opt. 2nd Ed., 1996, pp. 108-114,154-160, McGraw-Hill Co.
International Search Report, Dec. 12, 2011.

* cited by examiner

SYSTEM FOR LASER-BASED DIGITAL MARKING OF OBJECTS WITH IMAGES OR DIGITAL IMAGE PROJECTION WITH THE LASER BEAM SHAPED AND AMPLIFIED TO HAVE UNIFORM IRRADIANCE DISTRIBUTION OVER THE BEAM CROSS-SECTION

CROSS-REFERENCE TO RELATED APPLICATIONS

This application claims the benefit of U.S. Provisional No. 61/372,197 filed Aug. 10, 2010, and is incorporated herein by reference in its entirety.

FIELD OF THE INVENTION

The present invention is generally related to laser image amplification marking systems, and, more particularly, to a system comprising a laser beam-shaping arrangement to have a spatially uniform irradiance for the initial beam, a Spatial Light Modulator (SLM) and an optical amplifier configured to provide an amplified beam having a spatially uniform irradiance.

BACKGROUND OF THE INVENTION

It is known that optical representation of data, such as machine-readable bar codes, logos, etc., can be attached, placed or marked on products by various means, such as industrial ink jet printing, electrolytic chemical etching and laser markings. The data can serve multiple purposes including product identification, track and trace information, anti-counterfeit detection, etc. Laser-based marking devices do not require inks, solvents and other chemicals and thus can provide a marking implementation that is comparatively less expensive with lower operating costs and more environmental friendly, such as without generating hazardous solvent emissions. Moreover, the laser-based markings are generally longer lasting, have better resolution quality and do not wear off easily.

A majority of presently available laser-based marking systems use galvanometer-based optical scanning technology where a laser beam is scanned across the object to be marked. Although the technology has made advances in terms of speed and performance, placing a 2-D bar matrix code or a high resolution image on the object can be challenging. For example, placing a high resolution image with an example resolution of 1024 by 768 pixels would require 786,432 marking operations in a galvanometer-based system. On the other hand, a laser marking system based on a Spatial Light Modulator (SLM), such as a Micro-Electro-Mechanical-System (MEMS)-based digital micromirror device (DMD) or Liquid Crystal Devices (LCD) based SLMs etc., can simultaneously process a complete code matrix or a high resolution image in a single operation. The ability of these devices to project variable data at high speeds make them an excellent choice for laser marking systems performing serialized data bar coding specially two-dimensional (2-D) data matrix codes. However, certain drawbacks can arise during their operation. In SLM based marking, the total energy/power of the laser is shared among all the pixels as against a scanner based system where all the power is focused at one pixel. Thus, in order to mark the intended target, the overall energy/power of the laser has to be higher. However, the overall power cannot be increased indefinitely and is limited by the damage threshold of the SLM. Several approaches have been proposed that try to address these drawbacks, but with limitations.

One prior art laser marking system (U.S. Pat. No. 6,836,284) is believed to use a digital micromirror device (DMD), operating as a SLM that requires a beam expansion and beam contraction mechanism (i.e., requires optics adapted to intentionally affect the size of the cross-section of the beam) to avoid damage to the DMD. The beam expansion spreads the optical power of an incident beam over a larger area and thus reduces the irradiance (power per unit area) so that the DMD is not damaged. After reflection from the DMD, the beam is contracted again to increase the irradiance. The system described in the foregoing patent, however, is somewhat impractical since the physical dimensions and the cross-sectional area of available micromirror devices are relatively small (in the order of few square cm). Due to their small cross-sectional area, the present Applicant believes that the spatial profile of the incident laser beam cannot be expanded beyond a certain magnification limit (L), as shown in FIG. 14. That is, the irradiance of the incident laser beam cannot be reduced by a factor greater than L. Any further magnification (M>L) would result in part of the beam to miss the device. Thus, in practice, Applicant believes that the marking system proposed in the foregoing patent would not be effective for applications requiring optical intensities L times higher than the DMD damage threshold. Also, in applications where large sized marks are required, with mark size being comparable to the size of a DMD/SLM itself, Applicants submits that the beam expansion and contraction mechanism would be useless.

Another solution suggested in prior art to avoid damage to the SLM, as disclosed in U.S. Pat. No. 7,058,109, appears to involve standard lasers and amplifiers, which produce optical beams characterized by either a Gaussian irradiance distribution or other non-uniform distribution. As a result, the irradiance of the laser beam at the target surface would be Gaussian or non-uniform, which could adversely affect the quality of the marks, whether non-ablative or ablative. For example, in the case of marks based on ablative marking (as may involve a metal foil), the relatively high irradiance at the center of a Gaussian beam, as compared to substantially lower levels at the outer edges of the beam, could result in a melting of the foil at the center of the mark leaving a hole, whereas the irradiance level at the beam edge may not be sufficiently high to ablate the foil metal. For example, in the case of non-ablative marking (e.g., photo-chemical change of a coating under laser irradiance), the relatively high irradiance at the center of the Gaussian beam might lead to heat conduction to areas on the target that are not designated for marking, and the relatively weak irradiance at the outer edges of the beam may not be conducive to a color change. If a 2-D data matrix code is marked on a target (ablative or non-ablative) the non-uniform irradiance distribution would ruin the contrast ratio of the code and a code reader would be unable to read it. Thus, the irradiance distribution across the laser beam cross-section should be sufficiently uniform so that the information, i.e., the projected image is within acceptable quality levels, e.g., readable marks without loss of information. Accordingly, it is desirable to provide a practical and reliable SLM based laser marking system that provides a cost-effective solution to overcome the above-described issues.

BRIEF DESCRIPTION OF THE INVENTION

Exemplary embodiment of the present invention disclose a laser marking system for marking of objects with images, or digital image projection, with a laser beam shaped and amplified to have uniform irradiance distribution over the beam cross-section.

The laser marking system is disclosed comprising a laser apparatus configured to supply a laser beam having a non-Gaussian irradiance distribution over a beam cross-section, wherein the non-Gaussian irradiance distribution of the laser beam comprises a substantially uniform irradiance distribution over the beam cross-section. A spatial light modulator optically coupled to receive the laser beam, wherein the spatial light modulator is controlled to generate an output laser beam comprising an optical pattern across the beam cross-section to mark a target object with the data code matrix is also provided. Further part of the laser marking system is an optical amplifier coupled to the spatial modulator to receive the laser beam output from the spatial light modulator and generate an amplified laser beam containing the same optical pattern as generated by the spatial light modulator, the amplified laser beam from the optical amplifier having a substantially uniform amplification across the cross-section of the beam, thereby the amplified beam maintaining the substantially uniform irradiance distribution over its beam cross-section.

In another exemplary embodiment, the laser marking system comprises a means for generating a laser beam having a non-Gaussian irradiance distribution over a beam cross-section, wherein the non-Gaussian irradiance distribution of the laser beam comprises a substantially uniform irradiance distribution over the beam cross-section. A spatial light modulator optically coupled to receive the laser beam, wherein the spatial light modulator is controlled to generate an output laser beam comprising an optical pattern containing a data code matrix, a logo, or both across the beam cross-section to mark a target object with the data code matrix is also provided. Further provided is an optical amplifying means for generating an amplified laser beam containing the same optical pattern as generated by the spatial light modulator, the amplified laser beam from the optical amplifying means having a substantially uniform amplification across the cross-section of the beam, thereby the amplified beam maintaining the substantially uniform irradiance distribution over its beam cross-section.

BRIEF DESCRIPTION OF THE DRAWINGS

Aspects of the present invention will be more readily understood and the various advantages and uses thereof more readily appreciated, when considered in view of the following detailed description when read in conjunction with the following figures, wherein.

DETAILED DESCRIPTION

In accordance with one or more embodiments of the present invention, systems and techniques for laser-based marking are described herein. In the following detailed description, various specific details are set forth in order to provide a thorough understanding of various embodiments of the present invention. However, those skilled in the art will understand that embodiments of the present invention may be practiced without these specific details, that the present invention is not limited to the depicted embodiments, and/or that exemplary embodiments of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

A laser marking system embodying aspects of the present invention may use a semiconductor-based, digitally-controlled and programmable micro-electromechanical system (MEMS) device configured to operate as a spatial light modulator (SLM) by way of an array (e.g., thousands) of individually-addressable, tiltable micro-mirror pixels. One example of such a device is known in the art as a digital micromirror device (DMD), which is available from Texas Instruments Inc. Those skilled in the art will appreciate that aspects of the present invention are not limited to reflection-based SLMs being that other types of spatial light modulators (e.g., transmission type, as may use a liquid crystal display (LCD), can also be used. Further, while exemplary embodiments of the present invention describes SLM based laser image amplification system (LIAS) in context of laser marking, the image amplification technique can be used for projecting images used in other applications such as, but not limited to, optical lithography, laser direct writing, laser material transfer method, large screen home and cinema theatre etc.

Figure 1:
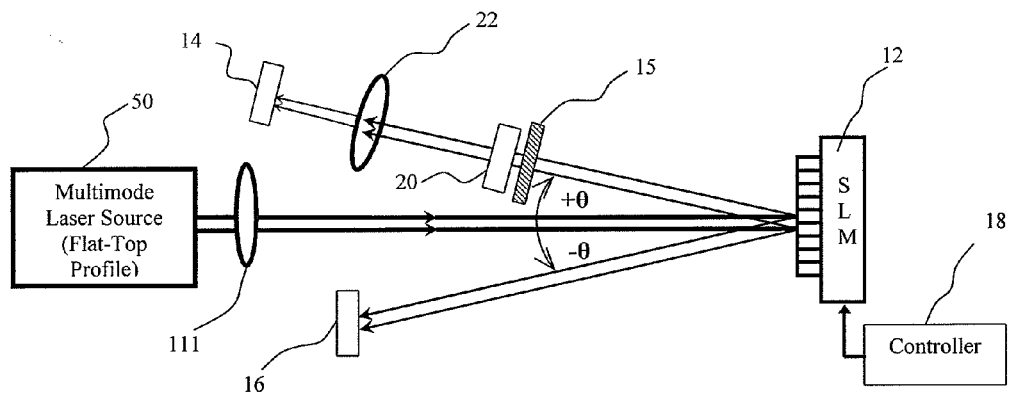
FIG. 1 shows a schematic representation of an example embodiment of a laser image amplification system (LIAS) using a laser source configured to produce a beam having a flat-top profile in accordance with aspects of the present invention.

As shown in FIG. 1, a laser light source 50, e.g., multimode laser source configured to provide a beam having a flat-top profile may be arranged so that a laser beam from source 50 strikes an SLM 12 (e.g., the above-described DMD) at normal incidence, for example. The Laser source 50 may be a continuous wave (CW) source or a pulsed laser source.

As one skilled in the art would appreciate, a laser beam (either fundamental mode or multi-mode) under Gaussian laser beam propagation, may be in a collimated state at its minimum beam waist location and thus in one example embodiment the incident laser light source may be controlled by an optical collimator 111, such that the beam has its minimum beam waist at a receiving surface of SLM 12. Example embodiments of optical collimator 111 may be a fiber gradient index (GRIN) lens coupled to a fiber carrying the incident beam, or may be one or more standard collimating lenses. It is noted that for a multi-mode laser with a non-Gaussian irradiance distribution, the location of the minimum spot size is the same as that of the fundamental mode with just the size of the beam changing at the receiving surface of the SLM 12.

Figure 4:
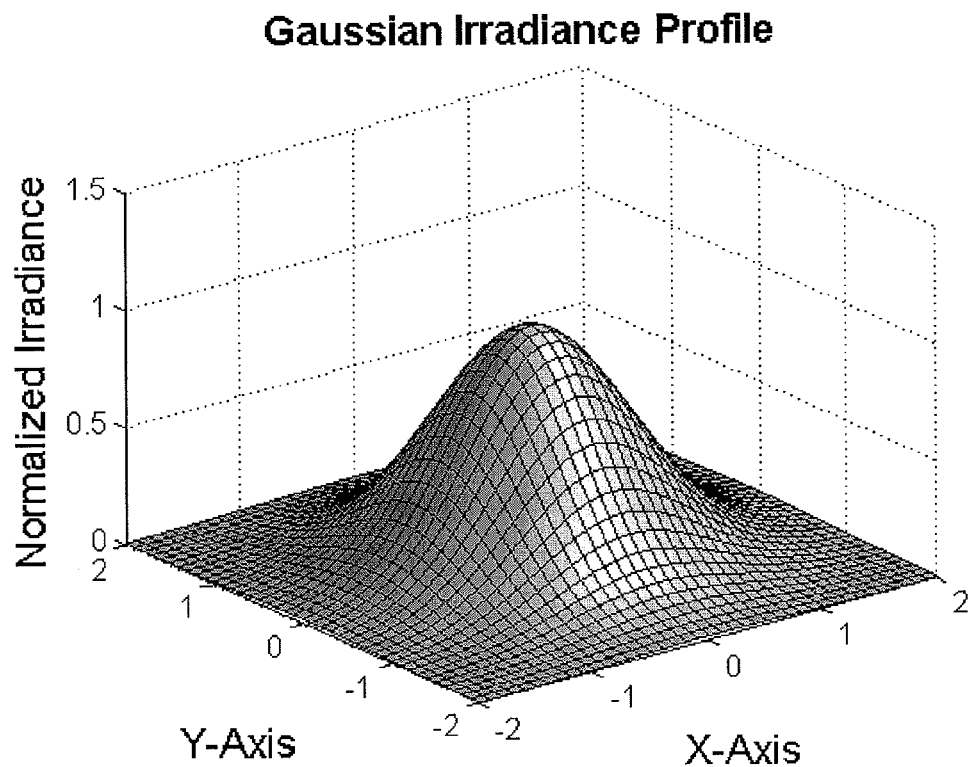
FIG. 4 illustrates an example Gaussian-shaped irradiance distribution of a laser beam.

As will be appreciated by one skilled in the art, a laser beam has a spatial distribution of irradiance across a laser beam cross-section. For example, if the laser used for marking purposes has a single transverse mode (e.g., fundamental or $TEM_{00}$ mode), then the laser irradiance distribution has a Gaussian shape, as shown in FIG. 4. It will be appreciated that non-Gaussian irradiance distributions can also be implemented for laser beams. For example, multi-mode lasers or lasers with higher-order modes can provide beams having a non-Gaussian irradiance distribution. The non-Gaussian irradiance distribution of a multi-mode laser beam may be qualitatively compared with the Gaussian irradiance distribution of a fundamental mode beam through a parameter referred to in the art as the $M^2$ factor. For the fundamental mode laser beams having a Gaussian distribution, the value of the $M^2$ factor is generally equal or close to unity while non-Gaussian beam distributions generally have $M^2$ values higher than unity.

Figure 5:
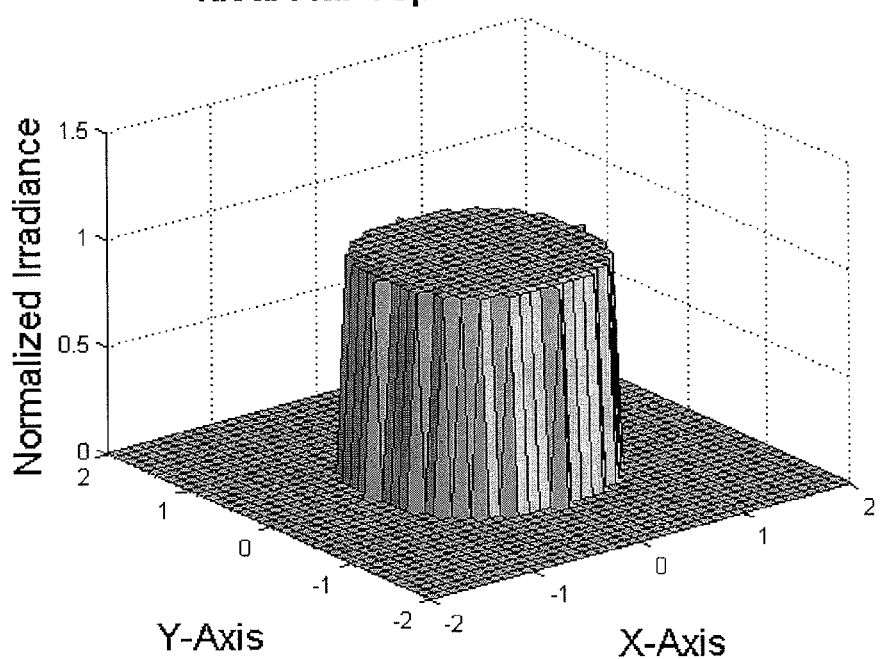
FIG. 5 illustrates an example non-Gaussian (e.g., idealized flat-top) irradiance distribution of a laser beam.

FIG. 5 illustrates an idealized non-Gaussian irradiance distribution known in the art as a flat-top (or mesa) laser beam irradiance distribution. By way of comparison, laser irradiance having a Gaussian distribution, as illustrated in FIG. 4, has a maximum value at a center of the beam and then the laser irradiance decreases radially outwards from the center of the beam in accordance with the Gaussian mathematical function. As further shown in FIG. 5, in an ideal flat-top laser beam, the irradiance distribution is absolutely uniform over the beam cross-section and thus is uniform over each segment of the image/barcode intended to be placed on a target, thus ensuring a consistently uniform marking quality.

In accordance with example embodiments of the present invention, the inventor of the present invention innovatively proposes a laser marking system embodying a laser beam having a substantially uniform non-Gaussian irradiance distribution (i.e., a flat-top irradiance distribution but for nominal tolerances or deviations, as will be readily understood by one skilled in the art) and an optical amplifier 20 configured to provide a substantially uniform amplification across the cross-section of the beam reflecting off the SLM 12 (DMD) (i.e., an optical amplifier configured to preserve the flat-top irradiance distribution of the beam). An optical isolator 15 may be disposed between SLM 12 and optical amplifier 20 to optically block amplified back reflections, if any, which could affect SLM 20.

In one example embodiment, multimode laser source 50 may be configured to provide an $M^2$ value so that the irradiance distribution of the laser beams from such a source can be considered to be a substantially uniform irradiance distribution. By way of example, a beam would be considered substantially flat-top, when the $M^2$ value of the beam has a value of approximately at least two or higher and when the laser irradiance level has reasonable ripple/uniformity, e.g., has a ripple variation within a range of about ±10%.

Figure 6:
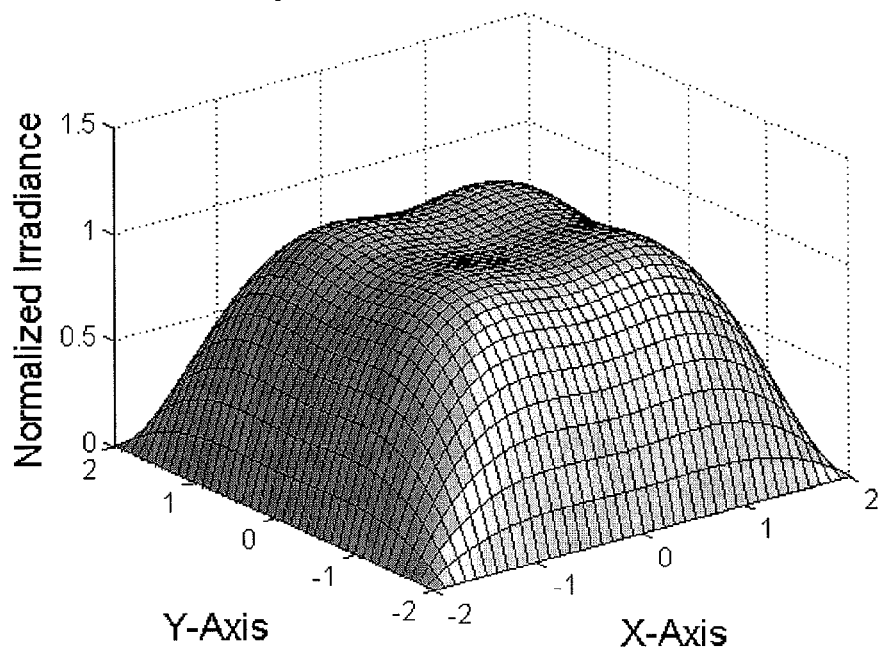
FIG. 6 illustrates an example non-ideal flat-top irradiance distribution, as may be used in a practical laser marking system embodying aspects of the present invention.

FIG. 6 illustrates a non-ideal flat-top irradiance distribution, which despite having some irradiance variation can provide a sufficiently flat-top in the central zone of the beam (e.g., may have a ripple variation within a range of about ±5%). In another example embodiment to be described in greater detail below, the laser source may be a fundamental mode laser source supplying a beam having a Gaussian irradiance distribution, which is then converted to a flat-top irradiance distribution.

Figure 2:
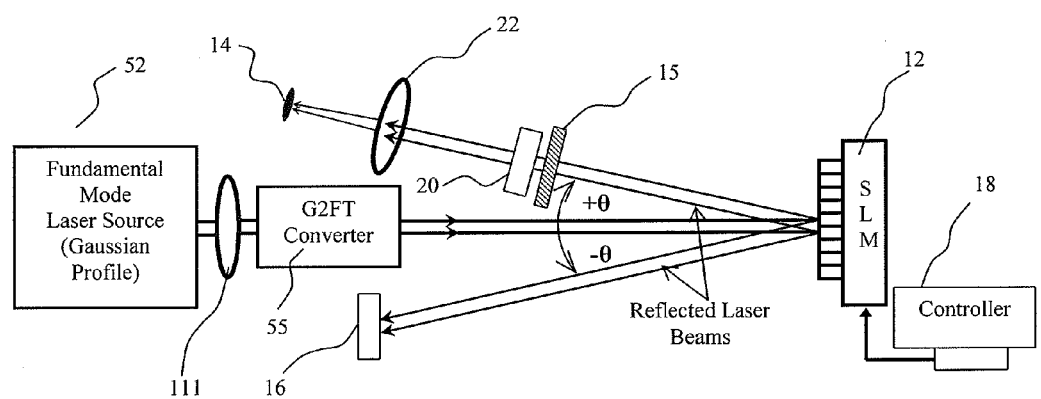
FIG. 2 shows a schematic representation of another example embodiment of a LIAS that in accordance with further aspects of the present invention uses a Gaussian to flat-top converter configured to supply a beam having a flat-top profile.

As shown in FIG. 2, a laser source 52 may be a fundamental mode laser source supplying a Gaussian beam distribution. Laser source 52 may be arranged so that a Gaussian beam from source 52 is optically coupled to pass through a beam shaper configured to cause an effect on the irradiance distribution of the beam. In one example embodiment, the beam shaper may be a Gaussian-to-flat-top beam distribution converter 55 so that an output beam from converter 55 is received by SLM 12 (e.g., the above-described DMD) at normal incidence, for example. The Gaussian-to-flat-top beam converter 55 may be a commercially available device, such as refractive beam shapers, available from Newport Corporation, CA and LIMO, Lissotschenko Mikrooptik Gmbh, Germany. It will be appreciated that converter 55 is not limited to any particular technical modality for performing the Gaussian-to-flat-top beam shaping, and may include one or more optical elements, such as diffractive optical elements, one or more lenses with aspheric surfaces, etc. It will be appreciated that in alternative embodiments a diffuser may be used to provide the beam irradiance shaping functionality, i.e. converting the Gaussian beam to a flat-top beam.

It is noted that using certain beam shapers effect the coherence of the laser. A Gaussian-to-flat-top beam distribution converter 55 does not adversely effect the coherent of laser beam but other beam converters such as diffusers adversely affect the coherence of a laser beam. Thus the beam shapers can be used to give coherent, partially coherent or incoherent beams. In all cases, the SLM reflection based images get amplified through uniform amplification. With a coherent beam, the overall system is considered to be coherent imaging optical system and analyzed accordingly. Whereas with incoherent beam, the overall system is considered to be incoherent imaging optical systems and it is analyzed accordingly. Although, exemplary embodiments of the invention are described in detail for coherent imaging, it is understood that exemplary embodiments of the invention cover incoherent imaging systems as well.

It will be appreciated that Gaussian-to-flat-top beam distribution converter 55 may be integrated as part of the laser source 52 or it may be a separate optical component located downstream from laser source 52. It will be appreciated that any of the above-described example arrangements would advantageously eliminate the prior art marking issues discussed earlier since in each case the irradiance distribution of the laser beam incident on the target would be a non-Gaussian irradiance distribution, and more particularly, a flat-top irradiance distribution. The foregoing beam irradiance shaping functionality to obtain flat-top laser beams (either through use of a beam converter, diffuser, or a multi-mode laser source) coupled with uniform optical amplification is expected to provide substantial operational improvements compared to known DMD-based laser marking systems, which lack such beam irradiance shaping functionality.

In operation each micromirror (in the array of individually controllable, tiltable mirror-pixels in SLM 12) can have two tilt states. For example, a first state when the micromirror is tilted by an angle $+\theta$ and a second state when the micromirror is tilted by an angle of $-\theta$ with respect to the normal to the device surface. When the micromirror is in a tilt state set at $+\theta$, the micromirror will reflect the laser light in a direction towards a target object 14. Conversely, when the micromirror is set in a tilt state of $-\theta$, the micromirror will reflect the laser light away from the target object, for example, towards an optical absorber/block 16, as shown in FIGS. 1 and 2.

Thus, when an example high resolution binary image is generated by SLM 12 in response to control signals from a controller 18, respective ones of the individually-controllable array of micromirrors in SLM 12 will be set to a respective $+\theta$ tilt state for each bit corresponding to a logic one in a given binary image. Similarly, respective ones of the individually-controllable array of micromirrors in SLM 12 will be set to a respective $-\theta$ tilt state for each bit corresponding to a logic zero in the given binary image.

Figure 3:
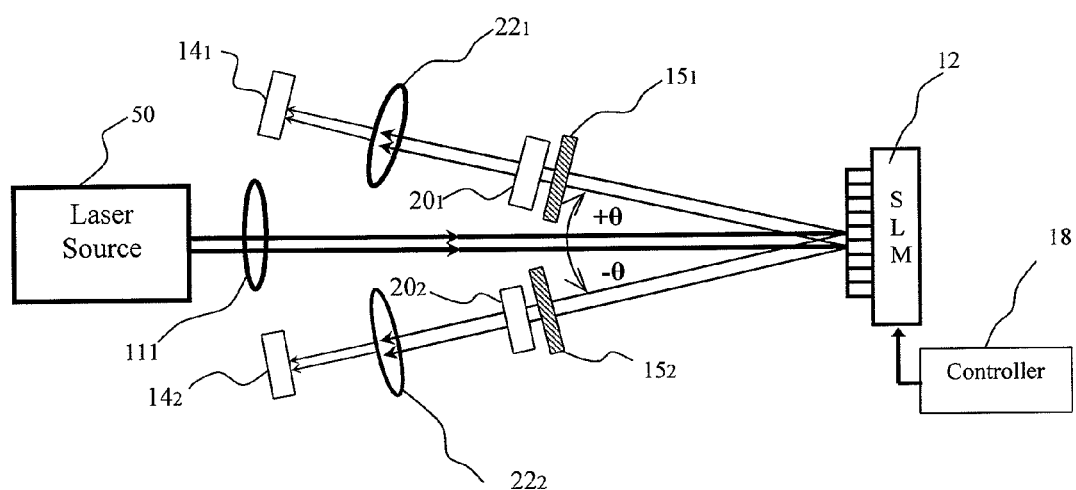
FIG. 3 shows a schematic representation of another example embodiment of a LIAS that in accordance with further aspects of the present invention may be used for marking objects with a logical complement of original information such as a code/image.

It will be appreciated that as target object 14 may be marked with an intended 2-D matrix code or a high resolution image after being amplified by optical amplifier 20, the beam incident on absorber/block 16 will contain an optical pattern that is the logical complement of the data code matrix or complementary code information. Thus, for marking applications where complementary 2-D matrix codes may be desirable, the absorber/block 16 may be eliminated and both beams (e.g., the first beam generated in response to a $+\theta$ tilt state and the second beam generated in response to a $-\theta$ tilt state) can be used for marking products $14_1$ and $14_2$, as shown in FIG. 3. That is, one beam may be used for marking the original data code matrix and the other beam may be used for marking the logical complement of the original data code matrix. In this latter case, as can be appreciated in FIG. 3, in lieu of absorber/block 16, the optical components to use would be essentially a duplicate of those shown in the optical path for the beam resulting when the mirrors are in the $+\theta$ tilt state.

As previously discussed, the magnitude of the incident laser beam irradiance, if not maintained within appropriate levels, can damage SLM 12. The inventor of the present invention has recognized (through use of optical devices configured to provide a beam having a flat-top irradiance distribution in combination with an optical amplifier configured to provide a substantially uniform amplification across the cross-section of the beam reflecting off the SLM 12 (DMD)) an innovative solution to the problem of avoiding damage to the micromirror device and maintaining uniform beam irradiance.

It is noted that aspects of the solution proposed by the inventor of exemplary embodiments of the present invention are not contingent on beam expansion and beam contraction. It is further noted that aspects of exemplary embodiments of the present invention ensure that the incident laser beam profile comprise a flat-top irradiance distribution and that, after reflection off the SLM 12, optical amplifier 20 is configured to provide uniform amplification across the laser beam cross-section so that the flat-top irradiance distribution of the beam is maintained after being amplified. Thus, the final irradiance of the beam can be significantly larger than the damage threshold of the SLM 12 through uniform amplification and the data carried within the cross-section of the beam remains essentially unchanged. Also, it is noted that exemplary embodiments of the invention analyse the effects of diffraction on the imaging and amplification system performance and ensure that those effects are dealt with necessary engineering solutions. Consequently, aspects of the present invention, in a straightforward manner overcome the practical spatial, diffractive and irradiance limitations that arise in the context of prior art marking systems using SLMs.

Consistent with the practical constraints of SLM 12, an appropriate level of energy (e.g., less than a predefined threshold level needed for reliable DMD operation) is established for the laser beam incident on the SLM 12 so that such a device is not damaged and functions with a substantially high level of reliability. In one example embodiment, a commercially available DMD (SLM 12) is rated to safely accept 10 W/cm$^2$ of incident optical power in an example wavelength range from approximately 420 nm to approximately 700 nm. Furthermore, in the example case of a pulsed laser operation, a reliable operating energy level of approximately 0.1 J/cm$^2$ has been reported for such a device. Thus, in this example case, the energy level of the incident laser beam should be kept below this threshold energy level. It will be appreciated that the foregoing levels should be construed in an example sense and not in a limiting sense.

Figure 7:
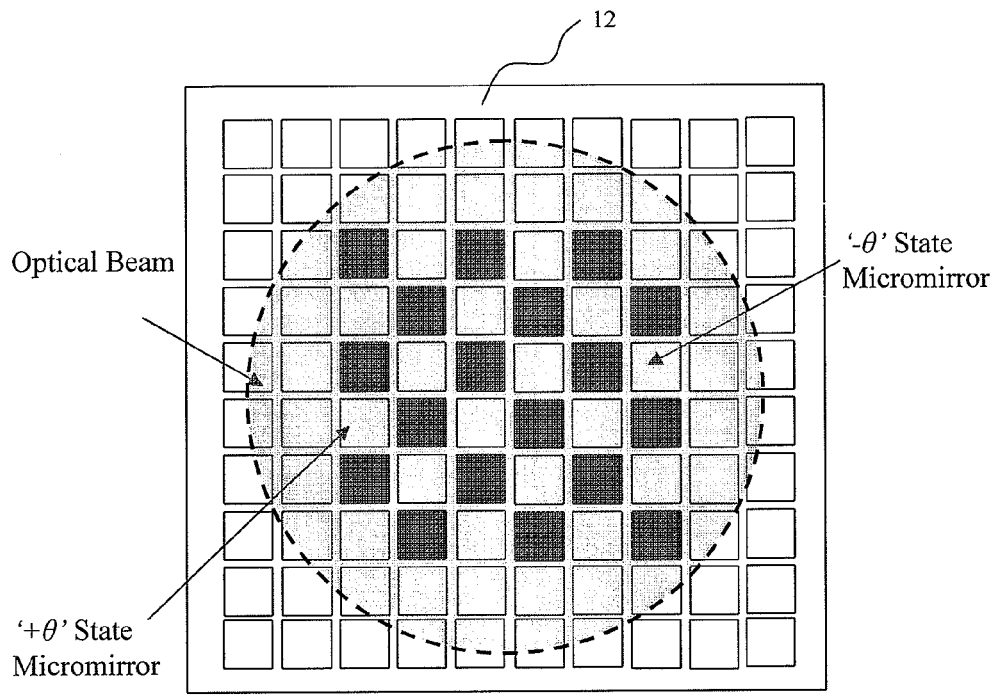
FIG. 7 illustrates an example of a 2-D data code matrix as may be constructed by a spatial light modulator (SLM), as may be used by a laser marking system in accordance with aspects of the present invention.
Figure 8:
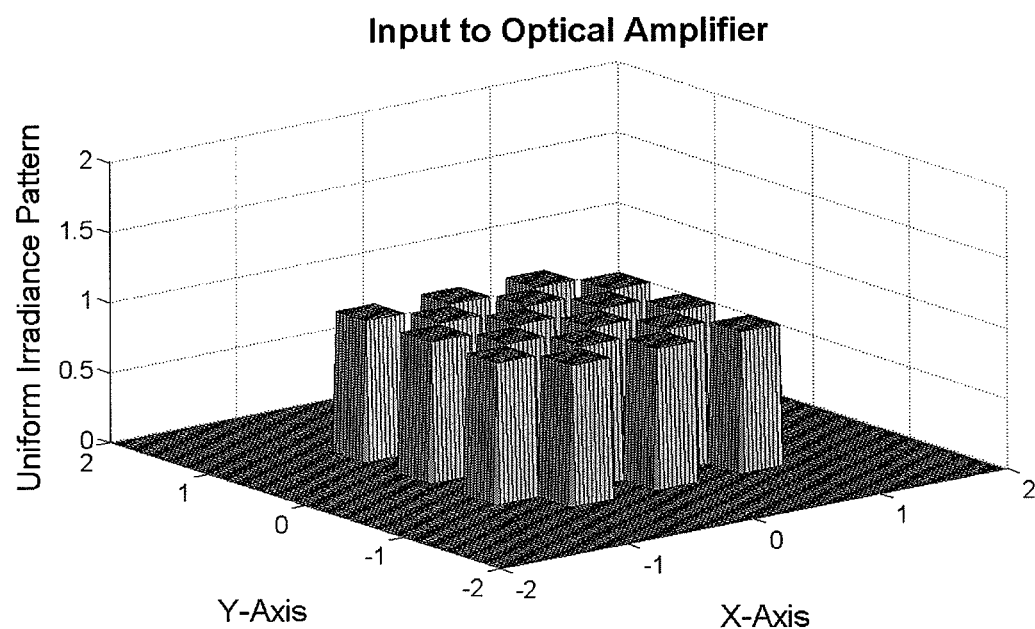
FIG. 8 shows an example resulting irradiance profile of a beam encoded with the example 2-D data code matrix shown in FIG. 7.

FIG. 7 illustrates a respective example of a 2-D data code matrix as may be constructed by SLM 12. Each respective micromirror in the $+\theta$ tilt state will contribute to form an output laser beam that comprises an optical pattern containing the data code matrix. This beam is directed towards the optical amplifier 20. An optical isolator 15, as illustrated in FIGS. 1 and 2, is placed between the SLM and the optical amplifier 20 in order to block any amplified back reflections that might damage the SLM. For the example case of the 2-D data code matrix shown in FIG. 7, FIG. 8 shows an example resulting irradiance profile of the beam reflecting off the SLM 12. FIG. 8 shows that the uniform/flat-top beam incident on the SLM 12 is spatially encoded with the pattern/image information and that each of the segments of the pattern/image has uniform irradiance level.

In accordance with aspects of exemplary embodiments of the present invention, optical amplifier 20 is configured to uniformly boost the laser beam intensity, i.e., the amplification factor is uniform across the whole beam cross-section. The uniform amplification ensures that all segments of the output patter/image have higher irradiance level while maintaining irradiance uniformity.

Figure 9:
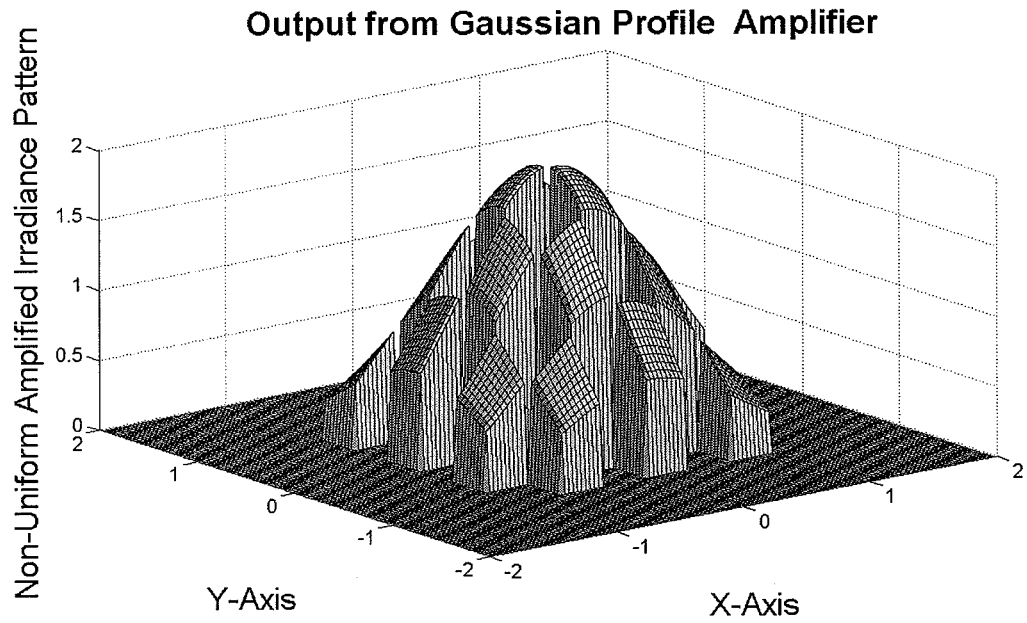
FIG. 9 shows a respective optical amplification profiles that may be used to comparatively conceptualize aspects of the present invention relative to optical amplification techniques generally used in prior art systems.
Figure 10:
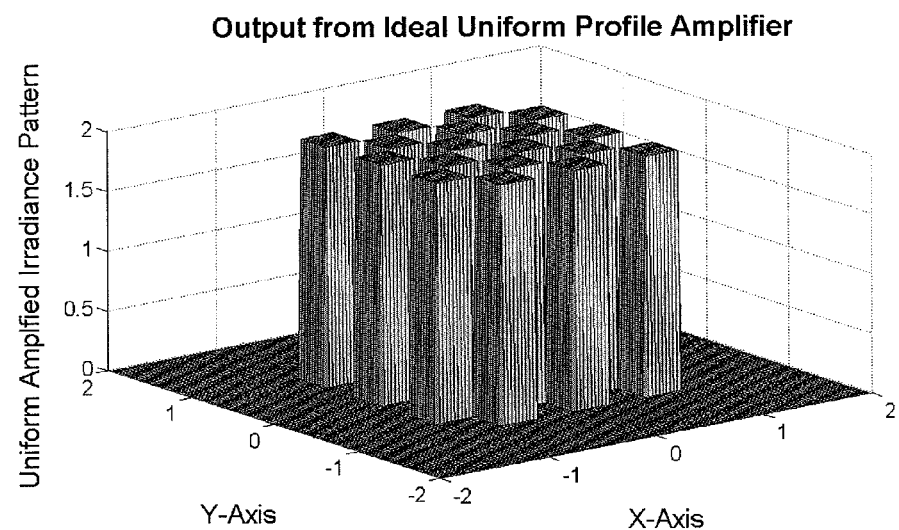
FIG. 10 shows another respective optical amplification profiles that may be used to comparatively conceptualize aspects of the present invention relative to optical amplification techniques generally used in prior art systems.
Figure 11:
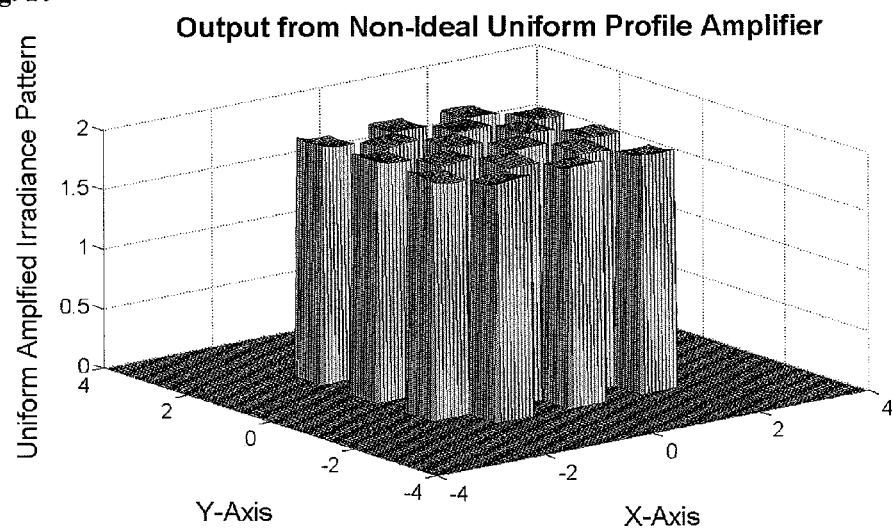
FIG. 11 shows yet another respective optical amplification profiles that may be used to comparatively conceptualize aspects of the present invention relative to optical amplification techniques generally used in prior art systems.

FIG. 9, FIG. 10 and FIG. 11 are used to comparatively conceptualize aspects of exemplary embodiments of the present invention relative to optical amplification techniques generally used in prior art laser marking system. In this example, the pattern/image shown in FIG. 8 represents an example optical input to be optically amplified.

FIG. 9 shows an example output pattern/image when the amplifier design provides non-uniform amplification, e.g., defined by a Gaussian function (see FIG. 4), across the beam cross-section, as is generally performed in prior art laser marking system. The output pattern irradiance from such an amplifier is believed to provide marks of unacceptable quality and in case of 2-D bar code patterns unreadable codes.

FIG. 10 shows an example output pattern/image when the amplifier design, in accordance with aspects of the present invention, provides ideal uniform amplification, e.g., an ideal flat-top response, as illustrated in FIG. 5, across the beam cross-section. FIG. 11 shows an example output pattern/image when the amplifier design provides non-ideal yet sufficiently uniform amplification, e.g., defined by a flat-top response that has a ripple variation within a range of about ±10% across the beam cross-section, as illustrated in FIG. 6. It will be appreciated that the example response illustrated in FIG. 10 comprise a theoretical response, and the example output pattern irradiance shown in FIG. 11 represents a realistic uniform amplification within a degree of acceptable variation. Thus, the optical design of optical amplifier 20 is configured to provide uniform amplification across the cross-section of the incident beam carrying the encoded pattern/image. That is, the amplified laser beam generated by optical amplifier 20 contains the same information (such as the earlier mentioned example of a data code matrix) as generated by spatial light modulator 12 but with a higher and spatially uniform irradiance.

It is contemplated that a system embodying aspects of the present invention can be advantageously used to provide either ablative or non-ablative marks on substances that require higher irradiances for marking. As will be readily understood by one skilled in the art, a non-ablative mark may be achieved through color change of the actual marked object or a coating, under the influence of the incident laser irradiance.

As will be appreciated by those skilled in the art, optical amplifiers are generally composed of a gain medium, pumping source/mechanism and/or optics (such as lenses, optics, gratings etc). Optical amplifiers can be broadly categorized in different classes, such as one-pass amplifiers, multi-pass amplifiers or regenerative amplifiers. The various interdependent factors such as degree of required amplification, gain and saturation properties of the gain medium, characteristics of the input beam etc. have to be configured via amplifier optical design to obtain the desired results. The optical design provides the coupling between the pumping source and the absorbing gain medium. It is also responsible for the pump power distribution in the gain medium which in turn influences the uniformity and optical distortions of the output beam.

Figure 12:
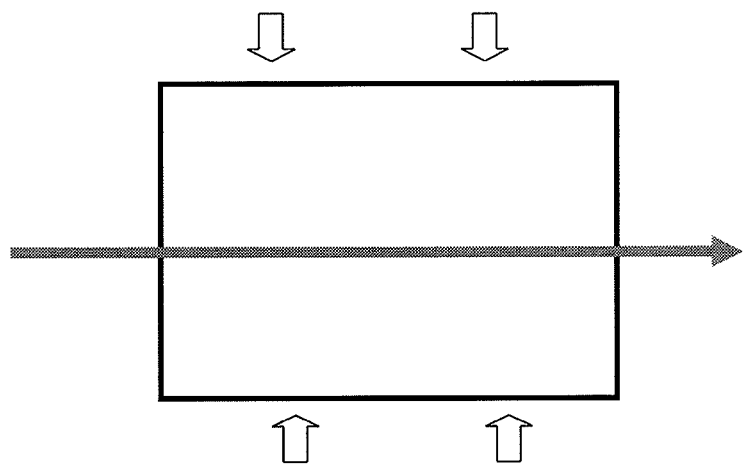
FIG. 12 shows an example optical amplifier architectures as may be used to provide an amplified laser beam having a substantially uniform amplification across the cross-section of the beam, which allows maintaining a substantially uniform irradiance distribution over the beam cross-section.

In one example embodiment, a one-pass optical amplifier might be used to function as the optical amplifier. In a one-pass amplifier, the input beam passes just once through the gain medium which is uniformly pumped by a pumping source to enable stimulated emission, as illustrated in FIG. 12. The gain medium of the optical amplifier, under stimulated emission, adds a substantial number of photons to the input beam entering the amplifier, thus increasing the energy content of the output beam. In this way, the spatially uniform irradiance input beam with information encoded across its cross section is uniformly amplified. The output beam has higher irradiance without significant loss in the signal to noise ratio (contrast ratio) for the information encoded across its cross section, i.e., all pixel have approximately the same level of irradiance.

Figure 13:
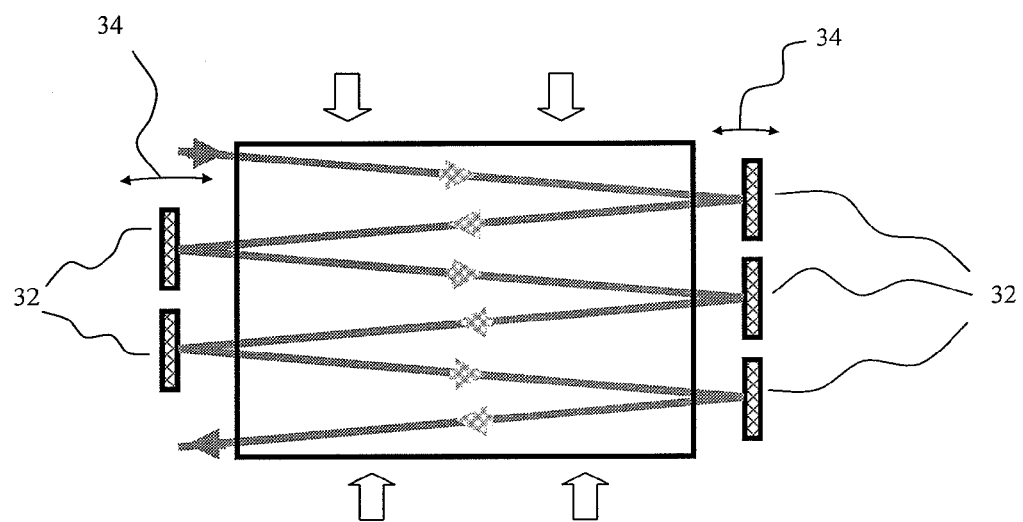
FIG. 13 shows another example optical amplifier architectures as may be used to provide an amplified laser beam having a substantially uniform amplification across the cross-section of the beam, which allows maintaining a substantially uniform irradiance distribution over the beam cross-section.
Figure 14:
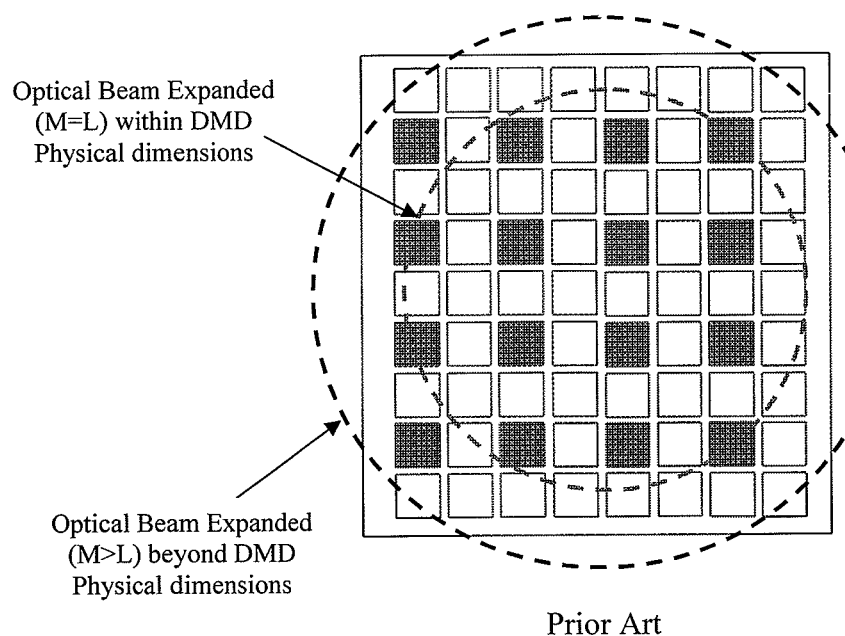
FIG. 14 graphically illustrates some of the practical limitations of a prior-art laser marking system based on a beam expansion-contraction mechanism that intentionally changes the size (i.e., cross-section) of a laser beam used by such a system.

In another example embodiment, a multi-pass optical amplifier might be used as the optical amplifier. Since any additional pass through the gain medium of the laser amplifier will provide an incremental amplification to the input beam, a multi-pass amplifier 30 having a mirror-array 32 may be used as the optical amplifier, as illustrated in FIG. 13. In this case, the gain/amplification medium is also uniformly pumped by the pumping source. The array of bulk-mirrors 32 may be selectively positioned relatively to an incident passing laser beam (e.g., via a tilt control arrangement represented by twin-headed arrow 34) to reflect the passing laser beam a number of times through the amplifying medium. As seen in FIG. 13, the passing beam propagates through a different optical path across the medium each time to make effective use of the available volume of the amplifying medium. A multi-pass optical amplifier might generally provide more amplification than a single-pass amplifier but it might also provide lower signal to noise ratio. It will be appreciated that various optical amplifier architectures may be used in the system design, as long as they satisfy the necessary condition of providing uniform amplification across the input beam cross-section.

Provided below are various examples of optical amplifiers and amplifying techniques that one skilled in the art may use for proving a substantially uniform amplification across the cross-section of the beam, so that the amplified beam maintains a substantially uniform irradiance distribution over its beam cross-section. The examples given below should be construed as illustrative of state of the art in connection with optical amplifiers configured to provide substantially uniform amplification to a laser beam. That is, they should be construed in an example sense and not in a limiting sense. For example, an optical amplifier may provide uniform amplification where the gain medium is pumped uniformly. The gain media may be essentially uniformly pumped using a multi-mode optical source which results in uniform amplification as well as uniform temperature profile in the gain medium. Having a uniform temperature profile may be an added benefit since it avoids or reduces thermal distortions. An exemplary amplifier may have a solid state gain medium and an arrangement of diode bars configured to provide uniform gain/amplification.

It will be appreciated by those skilled in the art that some of the foregoing examples are discussed in the context of providing uniform pumping to a laser cavity; however, those skilled in the art will appreciate that such examples can be readily adapted to pump an optical amplifier.

Figure 15:
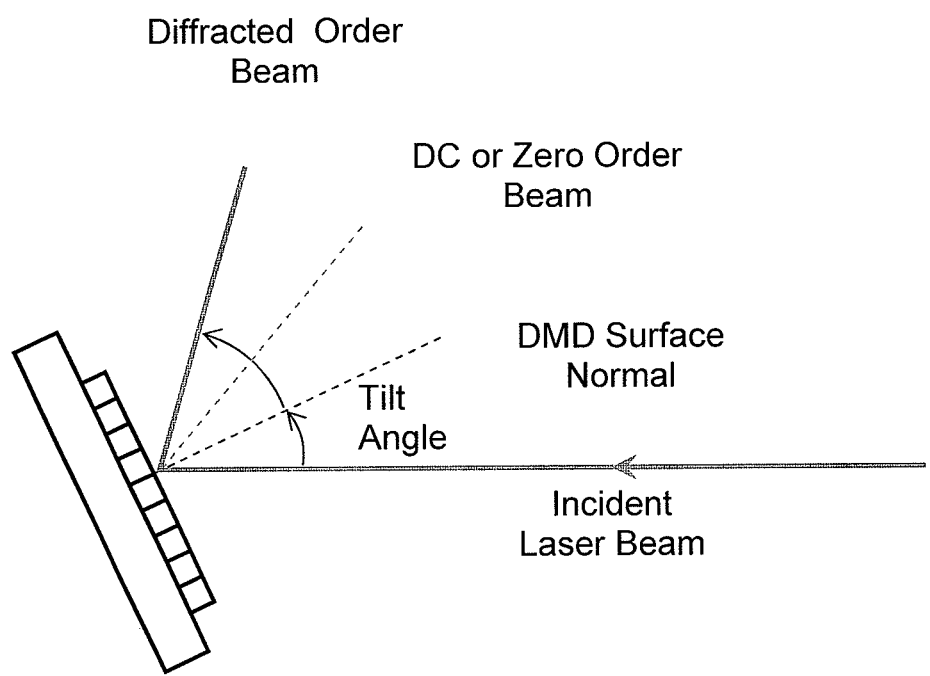
FIG. 15 shows a manner in which tilting the SLM through a certain angle allows the coupling of a majority of the laser power reflected off the SLM in one of the diffraction orders produced by the SLM.

Those skilled in the art would know that the size of elements in SLM 12 and other high resolution SLMs is typically small, e.g. in micrometers, leading to optical diffraction effects. For proper design of a system using SLMs the diffraction effects have to be taken into consideration. For example, the SLM 12 may be a 2-dimensional array of periodically spaced mirrors. When the array is illuminated with a laser, it behaves as a reflective diffraction grating. In essence, the diffraction produces multiple copies of the image generated by the SLM 12. However, by titling the SLM 12 through a certain angle, as illustrated in FIG. 15, a majority of the incident laser power can be coupled into one particular diffraction order and majority of the incident laser power would be coupled into one. The chosen order/image could then be optically amplified.

Figure 16A:
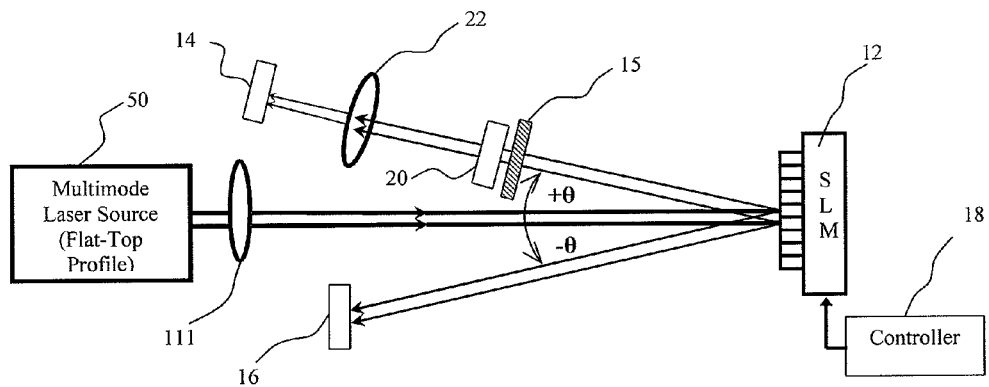
FIG. 16(a) shows how the uniform amplification can be performed before the imaging optics.
Figure 16B:
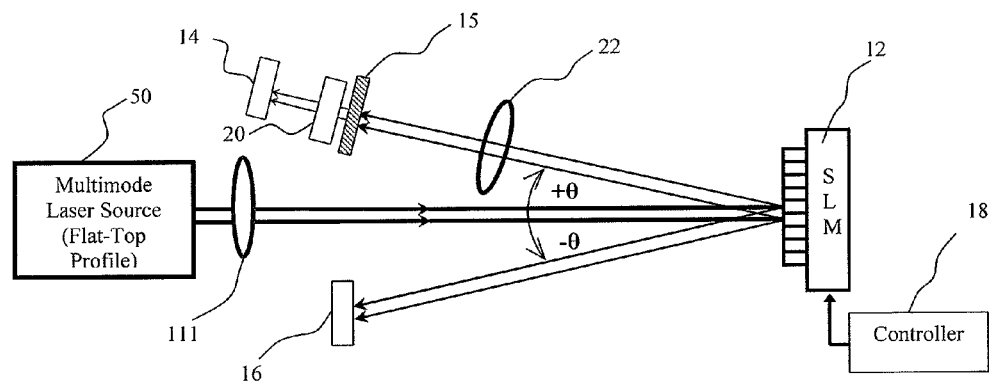
FIG. 16(b) shows how the uniform amplification can be performed after the imaging optics.

In an embodiment of the system in FIG. 1, coherent light or laser is used with an SLM where the SLM modulates the amplitude of the laser beam across a cross-section of the beam and where the modulation signal is the image created by SLM 12. The overall system is therefore a coherent optical system which necessitates coherent optical system analysis based on propagation and diffraction of coherent light. As described above, tilting the SLM 12 through an angle allows coupling majority of reflected light into one diffracted order. The image contained in this diffracted order beam goes under diffraction as it propagates (under Huygens-Fresnel principal). An optical-conditioning system 22 captures the propagating diffracted beam and forms a magnified/demagnified version of the SLM 12 image in the final image plane as maybe defined by the lens equation. As the diffracted order beam propagates, the information it carries across its cross section changes due to diffraction. Right at the surface of the SLM 12, the information is the image generated by the SLM 12 but before it enters the optical-conditioning system 22 the information it carries can be represented by the Fresnel diffraction pattern. After the beam has propagated through the lens and approached the final image plane, the information it carries changes from the Fresnel diffraction pattern to a magnified/demaginified version of the SLM 12 generated image. The information can be uniformly amplified before or after the optical-conditioning system 22. FIG. 16(*a*) illustrates how performing uniform amplification before the optical-conditioning system 22 will amplify the Fresnel diffraction pattern and FIG. 16(*b*) illustrates how performing uniform amplification after the optical-conditioning system 22 will amplify the image. The net result in both cases is the same, which is the uniform amplified scaled version of the image generated by SLM 12.

Returning to FIG. 1, the optical-conditioning system may be composed of collimating and aplanat focusing lenses. As one skilled in the art of optics would recognize, an aplanat lens is designed to be substantially free of spherical and/or coma wave-front errors or aberrations. The presence of either of these aberrations could distort an optical transmitting wave-front and could cause the final image on the surface of the marked test object to become irregularly shaped or blurred. The final amplified image contains the optical pattern having an example high resolution image or a 2-D matrix code imparted by SLM 12 (e.g., in terms of intense laser light for logic one bits and no light for logic zero bits).

In one example embodiment, the optical-conditioning system 22 may be arranged to project and focus the optical pattern on the surface of the target object 14 to be marked. In one example embodiment, the optical-conditioning system 22 may do so by capturing the beam with its minimum beam waist at the surface of the SLM 12. In one example embodiment, the regions on the surface of the target object that receive intense laser light (e.g., corresponding to logic one bits) get marked (or ablated) whereas other regions (e.g., corresponding to logic zero bits) experience no change. Thus, in this manner, the 2-D data code matrix is marked on the surface of the target object. Depending on the needs of any given marking application, optical-conditioning system 22 can be adjusted to magnify or reduce the size of the optical pattern that contains the 2-D code matrix or any other high resolution image.

In operation, the orientation of the micromirrors of SLM 12 and hence the optical pattern that contains the 2-D code information can be rapidly changed through the controller 18. If a given 2-D code can be represented as a code frame, the ability of the SLM 12 to re-orient its mirrors orientation and project new code frames at a substantially high frame rate, allows a image amplification system embodying aspects of the present invention to mark products with sequentially-changing code matrices and thus advantageously allows serialized laser marking of products at substantially high speeds. The high marking speed would allow numerous industries to incorporate the marking system in existing industrial production lines without affecting associated production processes.

It will be appreciated that during the serialized (e.g., sequential) laser marking process, the DMD is stationary since its spatial light modulating operation is implemented through changes in the orientation of its micromirrors. In one example embodiment, the products to be marked may be placed on a conveyer belt or a similar mechanism for moving objects and such products will be marked under the action of spatially uniformly amplified laser irradiance as they move.

In one example embodiment, SLM 12 can operate in various regions of the frequency spectrum of light, such as ultraviolet (UV), visible and near-infrared (IR) spectral ranges. Thus the wavelength of the incident laser beam can be suitably adjusted based on the type of material being marked. It will be appreciated that various characteristics of the laser irradiance induced mark may be similarly adjusted. By way of example and not of limitation, other laser parameters that may be suitably adjusted may include energy/power, spot size (for both continuous wave and pulsed lasers), pulse width, pulse repetition rate and number of pulses (for pulsed lasers).

It is mentioned earlier that, SLM 12 can operate in various regions of the frequency spectrum of light, such as ultraviolet (UV), visible and near-infrared (IR) spectral ranges. However, at shorter optical wavelengths, especially UV, the energy of the photons is much higher and their capability to damage the SLM 12 is also higher which is why the damage thresholds are much lower for the SLM 12 at shorter wavelengths. This limits the performance characteristics and in some cases the very viability of a lot of application systems that use image projection at shorter wavelengths. The laser image amplification technique can be used to generate and uniformly amplify an image using a higher wavelength and then using non-linear optics principles (frequency conversion) convert the laser and the image to a shorter wavelength. For example, 1064 nm wavelength laser incident on the SLM 12 generates an image which then gets uniformly amplified. The amplified 1064 nm image can then be converted to a 532 nm (visible green) wavelength image using frequency conversion non-linear optics/medium (frequency doubling) or to 355 nm (UV) wavelength image (frequency tripling). In this way, the SLM 12 only handles a longer wavelength with lower damaging strength but the final image is of a shorter much more powerful wavelength. This enables applications to use projected images with much higher irradiance levels at shorter optical wavelength such as UV. The frequency conversion can be performed using a frequency conversion device, such as, but not limited to, a non-linear optical (NLO) medium 60, as illustrated in FIGS. 17(*a*) and 17(*b*), after amplification where the NLO medium 60 is physically located before or after the optical-conditioning system 22.

Figure 17A:
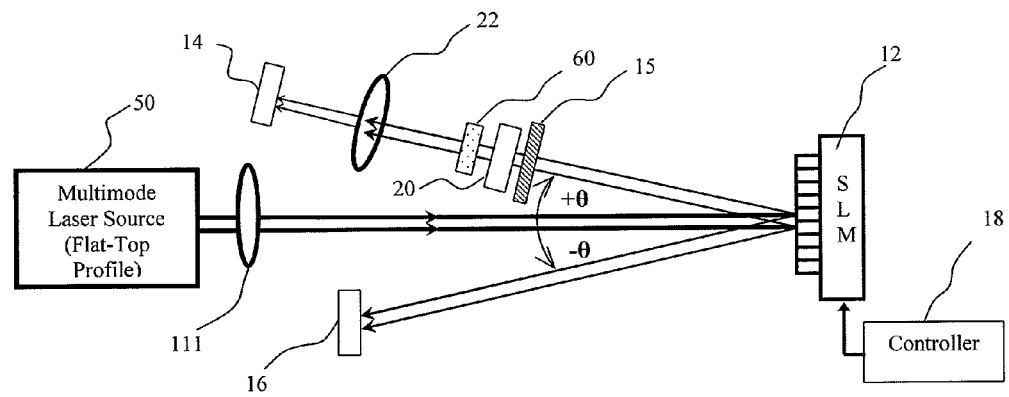
FIG. 17(a) shows how the (post uniform amplification) frequency conversion can be performed before the imaging optics.
Figure 17B:
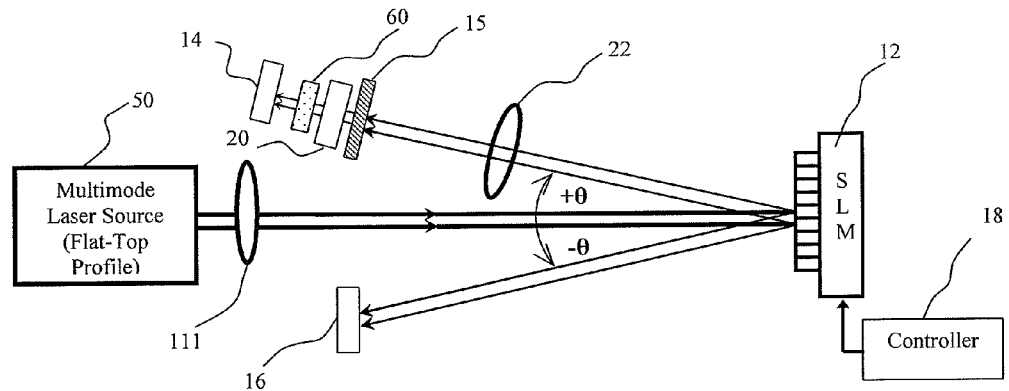
FIG. 17(b) shows how the (post uniform amplification) frequency conversion can be performed after the imaging optics.

Thus, FIG. 17(a) illustrates uniform amplification and subsequent frequency conversion of the Fresnel diffraction pattern before the optical-conditioning system 22 and FIG. 17(b) illustrates uniform amplification and subsequent frequency conversion of the image after the optical-conditioning system 22. The net result in both cases is the same, which is the uniform amplified scaled and frequency converted version of the image generated by SLM 12. Note, that in case of multiple pass uniform amplification, frequency conversion would be performed after the last pass of the image carrying beam through the amplifier.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated, any use of the terms first, second, etc., do not denote any order or importance, but rather the terms first, second, etc., are used to distinguish one element from another.

The invention claimed is:

1. A laser image amplification based optical system comprising:
   a laser apparatus configured to supply a laser beam having a non-Gaussian irradiance distribution over a beam cross-section, wherein the non-Gaussian irradiance distribution of the laser beam comprises a substantially uniform irradiance distribution over the beam cross-section;
   a spatial light modulator optically coupled to receive the laser beam, wherein the spatial light modulator is controlled to generate an output laser beam comprising an optical pattern across the beam cross-section to perform a laser material processing operation to mark a target object with an image or a pattern;
   an optical-conditioning system configured to control a quality of the optical pattern; and
   a uniformity maintaining optical amplifier coupled to the spatial modulator to receive the laser beam output from the spatial light modulator and generate an amplified laser beam such that a final optical pattern is an amplified version of the optical pattern as generated by the spatial light modulator, the amplified laser beam from the optical amplifier having a substantially uniform amplification across the cross-section of the beam, thereby the amplified beam maintaining the substantially uniform irradiance distribution over its beam cross-section;
   wherein the optical-conditioning system is configured to capture a propagating diffracted beam of the optical pattern and to form at least one of a magnified version and a demagnified version of the optical pattern.

2. The optical system of claim 1, wherein the laser beam with the substantially uniform irradiance distribution has a $M^2$ value that exceeds a predefined threshold value.

3. The optical system of claim 2, wherein the laser beam with the substantially uniform irradiance distribution has a ripple variation within a predefined range.

4. The optical system of claim 1, wherein the laser apparatus comprises a fundamental mode laser source configured to supply a laser beam having a Gaussian irradiance distribution, wherein the laser apparatus further comprises a Gaussian-to-non-Gaussian irradiance distribution converter that receives the laser beam having the Gaussian irradiance distribution and is configured to supply the laser beam having the substantially uniform irradiance distribution over the beam cross-section.

5. The optical system of claim 4, further comprising an optical collimator arranged to collimate the laser beam supplied by the fundamental mode laser source.

6. The optical system of claim 5, wherein the optical collimator comprises a gradient-index (GRIN) lens optically coupled to an optical fiber that carries the laser beam supplied by the fundamental mode laser source to the Gaussian-to-non-Gaussian irradiance distribution converter.

7. The optical system of claim 5, wherein the optical collimator comprises at least one collimator lens.

8. The optical system of claim 1, wherein the laser apparatus comprises a fundamental mode laser source configured to supply a laser beam having a non-uniform irradiance distribution (e.g. a Gaussian distribution), wherein the laser apparatus further comprises an optical diffuser that receives the laser beam having the non-uniform irradiance distribution and is configured to supply the laser beam having the substantially uniform irradiance distribution over the beam cross-section.

9. The optical system of claim 1, wherein the optical pattern comprises a digital image carrying specific information to be imparted on the target such as a data code matrix and/or a logo.

10. The optical system of claim 1, wherein the optical-conditioning system captures the propagating diffracted beam between the spatial light modulator and the optical amplifier or between the optical amplifier and a target area and wherein the amplifier is configured for placement before or after the optical conditioning system or between any two elements comprising the optical conditioning system.

11. The optical system of claim 1, wherein the amplified beam maintaining the substantially uniform irradiance distribution over its beam cross-section is applied to provide an image used for optical lithography.

12. The optical system of claim 1, wherein the amplified beam maintaining the substantially uniform irradiance distribution over its beam cross-section is applied to provide an image used for laser direct writing.

13. The optical system of claim 12, wherein laser direct writing comprises at least one of laser sintering and laser additive manufacturing.

14. The optical system of claim 1, wherein the amplified beam maintaining the substantially uniform irradiance distribution over its beam cross-section is applied to provide an image used for laser material transfer.

15. The optical system of claim 1, wherein the amplified beam maintaining the substantially uniform irradiance distribution over its beam cross-section is applied to provide an image viewed on at least one of a cinema theatre and a home theatre screen.

16. The optical system of claim 1, wherein the optical-conditioning system comprises at least one optical element configured to overcome at least one of spatial limitation, diffractive limitation, and irradiance limitation that originate from the spatial light modulator.

17. The optical system of claim 1, wherein the laser apparatus comprises a multimode laser source configured to supply the laser beam having the substantially uniform irradiance distribution.

18. The optical system of claim 1, further comprising an optical isolator configured to optically minimize amplified back reflections from reaching the spatial light modulator.

19. The optical system of claim 1, wherein the uniformity maintaining optical amplifier is capable of at least one of single pass amplification, multi-pass amplification, and regenerative amplification.

20. A laser image amplification based optical system comprising:
   means for generating a laser beam having a non-Gaussian irradiance distribution over a beam cross-section, wherein the non-Gaussian irradiance distribution of the laser beam comprises a substantially uniform irradiance distribution over the beam cross-section;
   a spatial light modulator optically coupled to receive the laser beam, wherein the spatial light modulator is controlled to generate an output laser beam comprising an optical pattern containing information or a logo across the beam cross-section to mark a target object with the information or logo;
   an optical-conditioning system configured to control a quality of the optical pattern; and
   a uniformity maintaining optical amplifying means for generating an amplified laser beam such that a final optical pattern is an amplified version of the optical pattern generated by the spatial light modulator, the amplified laser beam from the optical amplifying means having a substantially uniform amplification across the cross-section of the beam, thereby the amplified beam maintaining the substantially uniform irradiance distribution over its beam cross-section;
   wherein the optical-conditioning system is configured to capture a propagating diffracted beam of the optical pattern and to form at least one of a magnified version and a demagnified version of the optical pattern.

21. The optical system of claim 20, wherein the laser beam with the substantially uniform irradiance distribution has a $M^2$ value that exceeds a predefined threshold value.

22. The optical system of claim 20, wherein the laser beam with the substantially uniform irradiance distribution has a ripple variation within a predefined range.

23. The optical system of claim 20, wherein the means for generating the laser beam comprises a fundamental mode laser source configured to supply a laser beam having a Gaussian irradiance distribution, the laser beam supplied by the fundamental mode laser source optically coupled to a Gaussian-to-non-Gaussian irradiance distribution converter configured to supply the laser beam having the substantially uniform irradiance distribution.

24. The optical system of claim 20, further comprising an optical collimator arranged to collimate the laser beam supplied by the fundamental mode laser source.

25. The optical system of claim 24, wherein the optical collimator comprises a gradient-index (GRIN) lens optically coupled to an optical fiber that carries the laser beam supplied by the fundamental mode laser source to the Gaussian-to-non-Gaussian irradiance distribution converter.

26. The optical system of claim 24, wherein the optical collimator comprises at least one collimator lens.

27. The optical system of claim 20, wherein the means for generating the laser beam comprises a fundamental mode laser source configured to supply a laser beam having a Gaussian irradiance distribution, the laser beam supplied by the fundamental mode laser source optically coupled to an optical diffuser configured to supply the laser beam having the substantially uniform irradiance distribution over the beam cross-section.

28. The optical system of claim 20, wherein the spatial light modulator is selected from the group consisting of a reflection-based spatial light modulator and a transmission-based spatial light modulator.

29. The optical system of claim 20, wherein the optical-conditioning system captures the propagating diffracted beam between the spatial light modulator and the optical amplifier means or between the optical amplifier means and a target area and wherein the amplifier is configured be placed either before, after or in between any two the elements of the optical conditioning system.

30. The optical system of claim 20, wherein the amplified beam maintaining the substantially uniform irradiance distribution over its beam cross-section is applied to provide an image used for optical lithography.

31. The optical system of claim 20, wherein the amplified beam maintaining the substantially uniform irradiance distribution over its beam cross-section is applied to provide an image used for laser direct writing.

32. The optical system of claim 31, wherein laser direct writing comprises at least one of laser sintering and laser additive manufacturing.

33. The optical system of claim 20, wherein the amplified beam maintaining the substantially uniform irradiance distribution over its beam cross-section is applied to provide an image used for laser material transfer.

34. The optical system of claim 20, wherein the amplified beam maintaining the substantially uniform irradiance distribution over its beam cross-section is applied to provide an image viewed on at least one of a cinema theatre and a home theatre screen.

35. The optical system of claim 20, wherein the optical-conditioning system comprises an at least one optical element configured to overcome at least one of spatial limitation, diffractive limitation, and irradiance limitation that originate from the spatial light modulator.

36. The optical system of claim 20, wherein the means for generating the laser beam comprises a multimode laser source configured to supply the laser beam having the substantially uniform irradiance distribution.

37. The optical system of claim 20, further comprising an optical isolator configured to optically minimize amplified back reflections from reaching the spatial light modulator.

38. The optical system of claim 20, wherein the uniformity maintaining optical amplifier is capable of at least one of single pass amplification, multi-pass amplification, and regenerative amplification.

* * * * *

UNITED STATES PATENT AND TRADEMARK OFFICE
CERTIFICATE OF CORRECTION

PATENT NO. : 9,001,172 B2  
APPLICATION NO. : 13/206189  
DATED : April 7, 2015  
INVENTOR(S) : Farzan Ghauri It is certified that error appears in the above-identified patent and that said Letters Patent is hereby corrected as shown below:

On the Title Page, after (73) Assignee: change "VARDEX LASER SOLUTIONS, INC." to "VARDEX LASER SOLUTIONS, LLC"

Signed and Sealed this  
Twenty-first Day of July, 2015

Michelle K. Lee  
*Director of the United States Patent and Trademark Office*